United States Patent
Zhang et al.

(10) Patent No.: US 9,552,648 B1
(45) Date of Patent: Jan. 24, 2017

(54) OBJECT TRACKING WITH INTEGRATED MOTION-BASED OBJECT DETECTION (MOGS) AND ENHANCED KALMAN-TYPE FILTERING

(71) Applicant: HRL Laboratories, LLC, Malibu, CA (US)

(72) Inventors: Lei Zhang, Torrance, CA (US); Deepak Khosla, Camarillo, CA (US); Yang Chen, Westlake Village, CA (US)

(73) Assignee: HRL Laboratories, LLC, Malibu, CA (US)

(*) Notice: Subject to any disclaimer, the term of this patent is extended or adjusted under 35 U.S.C. 154(b) by 391 days.

(21) Appl. No.: 14/066,600

(22) Filed: Oct. 29, 2013

Related U.S. Application Data

(63) Continuation-in-part of application No. 13/669,269, filed on Nov. 5, 2012, now Pat. No. 9,196,053, and a continuation-in-part of application No. 13/743,742, filed on Jan. 17, 2013, now Pat. No. 9,177,228.

(60) Provisional application No. 61/589,781, filed on Jan. 23, 2012, provisional application No. 61/589,761, filed on Jan. 23, 2012.

(51) Int. Cl.
*G06T 7/20* (2006.01)

(52) U.S. Cl.
CPC ..................... *G06T 7/208* (2013.01)

(58) Field of Classification Search
None
See application file for complete search history.

(56) References Cited

U.S. PATENT DOCUMENTS

| | | | |
|---|---|---|---|
| 5,596,332 A * | 1/1997 | Coles | G01S 5/0009 342/455 |
| 5,940,538 A | 8/1999 | Spiegel et al. | |
| 8,186,626 B1 * | 5/2012 | Liu | B64G 1/24 244/158.8 |

(Continued)

OTHER PUBLICATIONS

Bunyak, Filiz, Ilker Ersoy, and S. R. Subramanya. "A multi-hypothesis approach for salient object tracking in visual surveillance." Image Processing, 2005. ICIP 2005. IEEE International Conference on. vol. 2. IEEE, 2005.*

(Continued)

*Primary Examiner* — Michelle Hausmann
*Assistant Examiner* — Michelle Entezari
(74) *Attorney, Agent, or Firm* — Tope-McKay & Associates

(57) ABSTRACT

Described is a system for object tracking with integrated motion-based object detection and enhanced Kalman-type filtering. The system detects a location of a moving object in an image frame using an object detection MogS module, thereby generating an object detection. For each image frame in a sequence of image frames, the system predicts the location of the moving object in the next image frame using a Kalman filter prediction module to generate a predicted object location. The predicted object location is refined using a Kalman filter updating module, and the Kalman filter updating module is controlled by a controller module that monitors a similarity between the predicted object location and the moving object's location in a previous image frame. Finally, a set of detected moving object locations in the sequence of image frames is output.

21 Claims, 12 Drawing Sheets

(56) References Cited

U.S. PATENT DOCUMENTS

| | | | | |
|---|---|---|---|---|
| 8,478,034 B2* | 7/2013 | Chang | ............ | G06K 9/342 375/240.12 |
| 8,699,767 B1 | 4/2014 | Khosla et al. | | |
| 8,774,517 B1 | 7/2014 | Khosla et al. | | |
| 9,213,087 B2* | 12/2015 | Erlandsson | ............ | G01S 11/026 |
| 2003/0169413 A1* | 9/2003 | Stanek | ............ | G06K 9/74 356/2 |
| 2004/0149036 A1* | 8/2004 | Foxlin | ............ | A61B 5/1113 73/511 |
| 2004/0203871 A1* | 10/2004 | Geier | ............ | H04W 64/00 455/456.1 |
| 2006/0285724 A1 | 12/2006 | Tian | | |
| 2007/0092110 A1* | 4/2007 | Xu | ............ | G06T 7/2033 382/103 |
| 2007/0218931 A1* | 9/2007 | Beadle | ............ | H04B 7/18589 455/502 |
| 2007/0279490 A1* | 12/2007 | Zhou | ............ | G06K 9/00771 348/143 |
| 2008/0004796 A1* | 1/2008 | Schott | ............ | G01C 21/005 701/434 |
| 2008/0031526 A1 | 2/2008 | Bushell et al. | | |
| 2008/0187219 A1 | 8/2008 | Chen et al. | | |
| 2009/0041359 A1* | 2/2009 | Park | ............ | G06K 9/00771 382/199 |
| 2010/0088030 A1* | 4/2010 | Stephens | ............ | B63H 25/04 701/500 |
| 2011/0150274 A1* | 6/2011 | Patwardhan | ............ | G06T 7/0089 382/103 |
| 2011/0229025 A1 | 9/2011 | Zhao et al. | | |
| 2011/0293190 A1* | 12/2011 | O'Callaghan | ............ | G06T 7/20 382/197 |
| 2012/0130284 A1* | 5/2012 | Ma | ............ | G01C 21/005 600/595 |
| 2012/0319894 A1* | 12/2012 | Tominaga | ............ | G01S 19/22 342/357.23 |
| 2012/0327220 A1* | 12/2012 | Ma | ............ | G06T 7/0038 348/135 |
| 2013/0166711 A1* | 6/2013 | Wang | ............ | H04N 7/181 709/223 |
| 2013/0272565 A1* | 10/2013 | Fagundes | ............ | H04M 3/523 382/100 |
| 2014/0003708 A1* | 1/2014 | Datta | ............ | G06K 9/6256 382/159 |
| 2014/0055610 A1* | 2/2014 | Ko | ............ | G06K 9/00771 348/143 |
| 2014/0085475 A1* | 3/2014 | Bhanu | ............ | G06K 9/00825 348/148 |

OTHER PUBLICATIONS

D. Simon in "Kalman Filtering with State Constraints: A Survey of Linear and Nonlinear Algorithms," IET Control Theory & Applications, vol. 4, Issue 8, Aug. 2010, pp. 1303-1318.

Kyungnam Kim et al. in "Real-time foreground-background segmentation using codebook model," in Real-Time Imaging, vol. 11 Issue 3, Jun. 2005.

Liu et al. in "Learning to Detect a Salient Object" In Proceedings of the IEEE Conference on Computer Vision and Pattern Recognition (CVPR), Minneapolis, Minnesota, 2007.

Deng Cai et al. "in Hierarchical clustering of WWW image search results using visual, textual and link information," in the proceedings of the 12th annual ACM international conference on multimedia, pp. 952-959, 2004.

B. Draper and A. Lionelle. Evaluation of Selective Attention under Similarity Transforms. In Workshop on Performance and Attention in Computer Vision. Graz, Austria, Apr. 2003.

R. Eckhom, R. Bauer, W. Jordan, M. Brosch, M. Kruse, W. Munk, and H.J. Reitboeck, Coherent Oscillations: A Mechanism of Feature Linking in the Visual Cortex?Biological Cybernetics 60. 121-130, 1988.

C.M. Gray, P. Konig, A.K Engel, and W. Singer Oscillatory Responses in Cat Visual Cortex Exhibit Intercolumnar Synchronizaton Which Reflects Global Stimulus Properties. Nature 338: 334-336, 1989.

L. Itti and C. Koch. A saliency-based search mechanism for overt and covert shifts of visual attention. Vision Research, 40: 1489-1506, 2000.

L. Itti C. Koch, and E. Niebur. A Model of Saliency-Based Visual Attention for Rapid Scene Analysis. IEEE Transactions on Pattern Analysis and Machine Intelligence, 20, 1254-1259, 1998.

V. Navalpakkam, L. Itti, Modeling the Influence of Task on Attention, Vision Research, 45: 205-231, 2005.

V. Navalpakkam, and L. Itti, An integrated model of top-down and bottom-up attention for optimal object detection, In: Proc. IEEE Conference on Computer Vision and Pattern Recognition (CVPR), 1-7, 2006.

S.A. Nene, S.K. Nayar, and H. Murase. Columbia Object Image Library (COIL-100). Technical Report CUCS-006-96. Feb. 1996. http://www.cs.columbia.edu/CAVE/software/softlib/coil-100.php.

E. Niehur, C. Koch. Control of Selective Visual Attention: Modeling the 'Where' Pathway. In. D. Touretzky, M. Mozer, and M. Hasselmo. Neural Information Processing Systems (NIPS 8). 802-808 Cambridge, MA, MIT Press. 1996.

F. Orabone, G. Metta and G. Sandini. Object-based Visual Attention: A Model for a Behaving Robot. In 3rd International Workshop on Attention and Performance in Computational Vision (in CVPR 2005), San Diego, CA, Jun. 2005.

B.J. Scholl. Objects and Attention: The State of the Art. Cognition 80: 1-46, 2001.

Y. Sun and R. Fisher. Hierarchical Selectivity for Object-based Visual Attention, Submitted to Artificial Intelligence. 2004.

D. Walther, L. Itti, M. Riesenhuber, T. Poggio, and C. Koch. Attentional Selection for Object Recognition—a Gentle Way. Lecture Notes in Computer Science 2525: 472-479, 2002.

J.M. Wolfe. Visual Search in Continuous, Naturalistic Stimuli. Vision Research 34: 1187-1195, 1994.

University of California, San Diego Complex Systems and Cognition Laboratory. CSCLAB Image Database. 2006. http://csclab.ucsd.edu/labeledimages.php.

C. Stauffer and W.E.L. Grimson, "Adaptive background mixture models or real-time tracking." Int. Conf. Computer Vision and Pattern Recognition, vol. 2. pp. 246-252, 1999.

A. Elgammal, D. Harwood, and L. S. Davis. "Non-parametric model for background subtraction," European Conf. Computer Vision, vol. 2, pp. 751-767, 2000.

T. Kohonen, "Learning vector quantization," Neutral Networks, vol. 1, pp. 3-16. 1988.

Kyungnam Kim, Thanarat H. Chalidabhongse, David Harwood, and Larry Davis. "Realtime foreground-background segmentation using codebook model," Real-Time Imaging, vol. 11, Issue 3, Jun. 2005.

Huber, D. and Khosla, D. "A Bio-Inspired Method and System for Visual Object-Based Attention and Segmentation" Proc. SPIE 7696, 769613 (SPIE Defense, Security, and Sensing), 2010.

L. Itti and P. Baldi, Bayesian Surprise Attracts Human Attention. Vision Research 49: 1295-1306, 2008.

D. Khosla, C. Moore, D. Huber, S. Chelian, Bio-Inspired Visual Attention and Object Recognition. In. Proc. SPIE Defense, Security, and Sensing, 6580, 656003, 2007.

Notice of Allowance for U.S. Appl. No. 13/743,742, Date mailed: Jun. 22, 2015.

Notice of Allowance for U.S. Appl. No. 13/669,269, Date mailed: Jul. 17, 2015.

Ruesch et al. (2008) "Multimodal saliency based bottom up attention: a framework for the humanoid robot iCub." Proc. 2008 IEEE Int'l Conf. on Robotics and Automation, pp. 962-967.

Huber et al. (2009) "Fusion of multi-sensory saliency maps for automated perception and control." Proc. SPIE vol. 7336.

Itti et al. (Jan. 2001) "Feature combination strategies for saliency-based visual attention systems." J. Electronic Imaging, vol. 10 No. 1, pp. 161-169.

Klein et al. (Nov. 2011) "Center-surround divergence of feature statistics for salient object detection." Proc. 2011 IEEE Int'l Conf. on Computer Vision, pp. 2214-2219.

(56) References Cited

OTHER PUBLICATIONS

Khosla et al. (2009) "Biologically inspired robust and adaptive multi-sensor fusion and active control." Proc. SPIE vol. 7345.

Khosla et al. (2009) "3d hierarchical spatial representation and memory of multimodal sensory data." Proc. SPIE vol. 7345.

Khosla et al. (201 0) "Neurally inspired rapid detection of sparse objects in videos." Proc. SPIE vol. 7697.

Kim et al. (2005) "Real-time foreground-background segmentation using codebook model." Real-Time Imaging, vol. 11 pp. 172-185.

Huber et al. (2010) "A bio-inspired method and system for visual object-based attention and segmentation." Proc. SPIE vol. 7696, Article 13.

\* cited by examiner

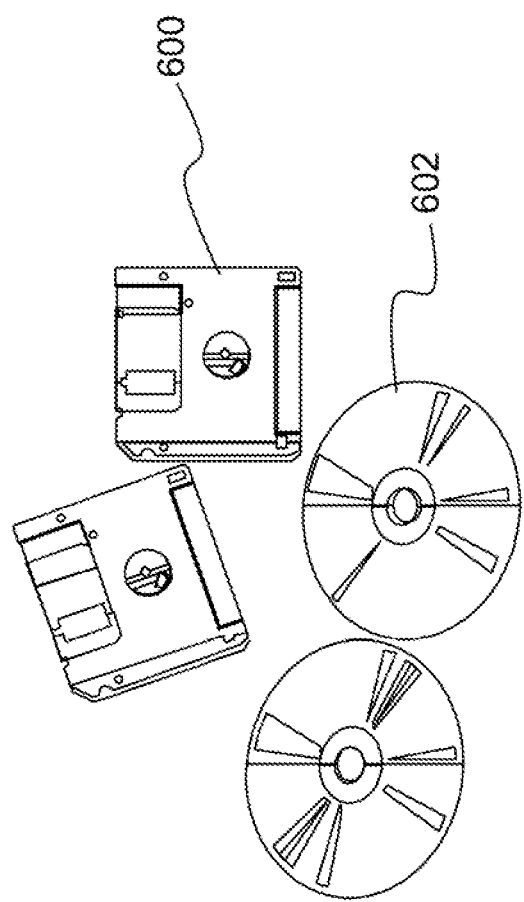

OBJECT TRACKING WITH INTEGRATED MOTION-BASED OBJECT DETECTION (MOGS) AND ENHANCED KALMAN-TYPE FILTERING

CROSS-REFERENCE TO RELATED APPLICATIONS

This is a Continuation-in-Part application of U.S. Non-Provisional application Ser. No. 13/669,269, filed on Nov. 5, 2012, entitled, "Motion-Seeded Object Based Attention for Dynamic Visual Imagery", which is a Non-Provisional Application of U.S. Provisional Application No. 61/589,781 application, filed on Jan. 23, 2012, entitled, "Motion-Seeded Object Based Attention for Dynamic Visual Imagery."

This is also a Continuation-in-Part application of U.S. Non-Provisional application Ser. No. 13/743,742, filed on Jan. 17, 2013, entitled, "Method and System for Fusion of Fast Surprise and Motion-Based Saliency for Finding Objects of Interest in Dynamic Scenes", which is a Non-Provisional Application of U.S. Provisional Application No. 61/589,761 application, filed on Jan. 23, 2012, entitled, "Method and System for Fusion of Fast Surprise and Motion-Based Saliency for Finding Objects of Interest in Dynamic Scenes."

GOVERNMENT LICENSE RIGHTS

This invention was made with government support under U.S. Government Contract Number W31P4Q-08-C-0264. The government has certain rights in the invention.

BACKGROUND OF THE INVENTION (1) Field of Invention

The present invention relates to a system for object tracking and, more particularly, to a system for object tracking using motion-based object detection and an enhanced Kalman-type filtering.

(2) Description of Related Art

Object tracking remains an unsolved problem in the computer vision and machine learning society. Many advanced approaches often rely on hand-crafted models and require complex computation, making them rather "expensive" for resource-restrictive and large-throughput-required applications. Motion-based object detection (MogS) technology is described in U.S. application Ser. No. 13/669,269 (hereinafter referred to as the '269 application) and U.S. application Ser. No. 13/743,742 (hereinafter referred to as the '742 application), both of which are hereby incorporated by reference as though fully set forth herein. MogS is based on a simple, yet powerful, background modeling and learning approach. Given an online updated background model, moving objects can be detected simply by measuring the difference between the current frame and the background model. Nevertheless, MogS itself does not have tracking capability and, therefore, may miss detecting the objects in different places.

The Kalman filter is a process that uses a series of measurements observed over time, containing noise and other inaccuracies, and produces estimates of unknown variables that tend to be more precise than those based on a single measurement alone, as described by D. Simon in "Kalman Filtering with State Constraints: A Survey of Linear and Nonlinear Algorithms," IET Control Theory & Applications, Volume 4, Issue 8, August 2010, pp. 1303-1318, which is hereby incorporated by reference as though fully set forth herein. The Kalman filter is a widely used simple and efficient tracking technique. The conventional Kalman filter can be added into any object detection process to form a simple object tracking system. Using the target location detected by MogS, one could apply Kalman filtering to predict and track the object's moving trajectory. However, the conventional Kalman filter is too simple to deal with the loss of tracking issue for MogS detection.

Each of the prior methods described above exhibit limitations that prevent them from being able to deal with the loss of tracking issue. Thus, a continuing need exists for an enhanced Kalman filtering process that improves motion tracking.

SUMMARY OF THE INVENTION

The present invention relates to a system for object tracking and, more particularly, to a system for object tracking using motion-based object detection and an enhanced Kalman-type filtering. The system comprises one or more processors and a memory having instructions such that when the instructions are executed, the one or more processors perform multiple operations. First, a location of a moving object is detected in an image frame of a sequence of image frames using a motion-based object detection MogS module, thereby generating an object detection. For each image frame in the sequence of image frames, the location of the moving object in the next image frame is predicted using a Kalman filter prediction module, thereby generating a predicted object location. The predicted object location is refined using a Kalman filter updating module, and the Kalman filter updating module is controlled by a controller module that monitors a similarity between the predicted object location and the moving object's location in a previous image frame. Finally, a set of detected moving object locations in the sequence of image frames is output.

In another aspect, the system determines a spatial distance d between each object detection in a current image frame and the object detection in the previous image frame with the controller module.

In another aspect, the system determines a dissimilarity metric diff between the predicted object location and a target image template stored in a historical template database.

In another aspect, the system merges the spatial distance d with the dissimilarity metric diff to generate a combined dissimilarity measure D that quantifies the dissimilarity of the predicted object location with the moving object's location in the previous image frame.

In another aspect, the system generates the combined dissimilarity measure D according to the following:

$$D = \alpha * \frac{1 - e^{-\beta * d}}{1 + e^{-\beta * d}} + (1 - \alpha) * \text{diff},$$

where $\alpha \in (0,1)$ is a constant scalar, $d \geq 0$, $\beta > 1$ is a constant scalar, $*$ denotes multiplication, and $e^x$ represents an exponential function.

In another aspect, the system updates a background model comprising a plurality of pixels belonging to a background of an image frame. In each image frame, at least one moving pixel is detected by subtracting the current image frame from the background model, generating detected moving pixels. The detected moving pixels are processed to reduce noise. Blobs of foreground pixels are detected through morphological operations and blob detection, resulting in an object detection.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is an illustration of a computer program product according to the principles of the present invention.

DETAILED DESCRIPTION

Figure 1:
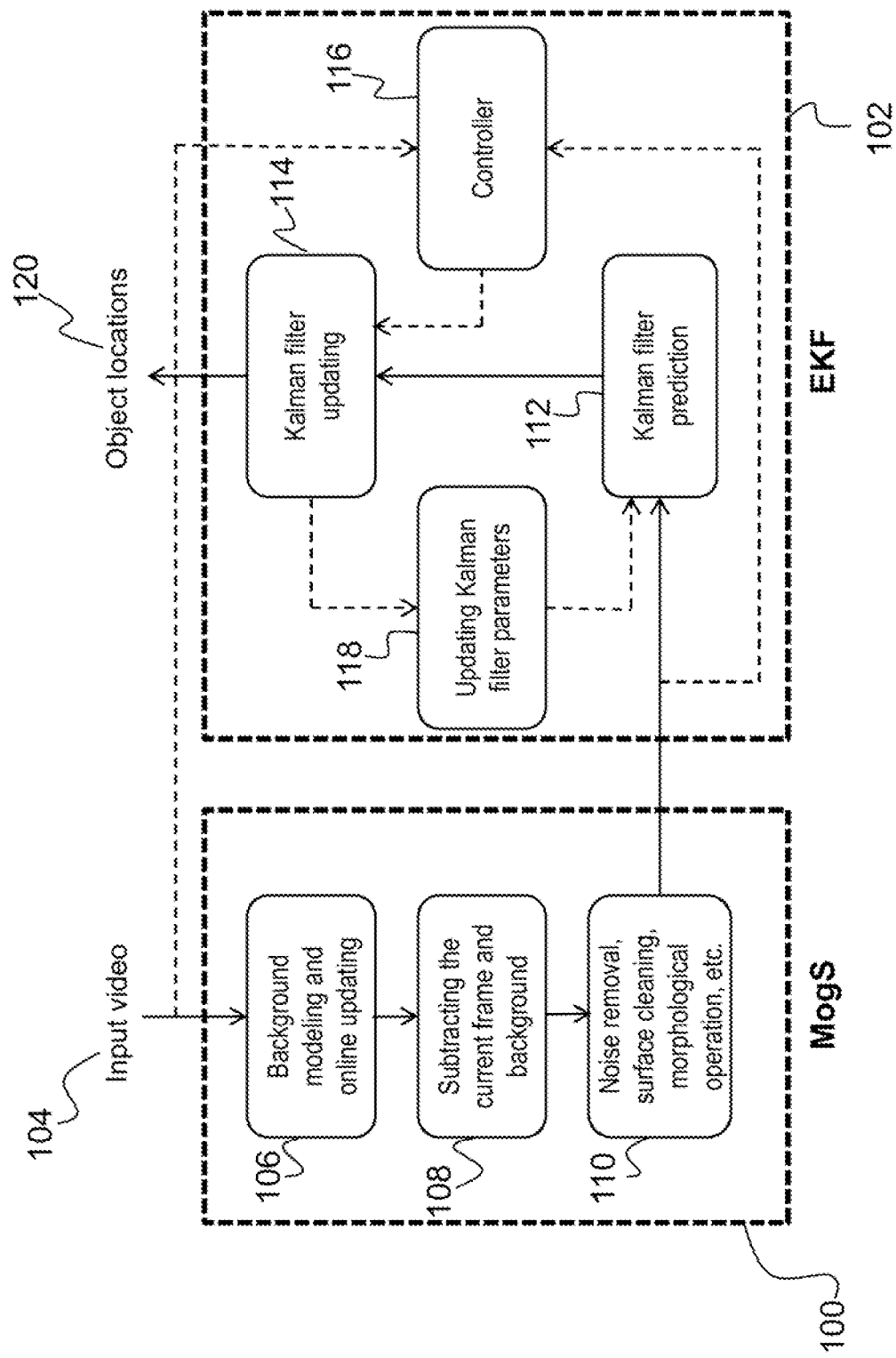
FIG. 1 is a flow diagram illustrating an object detection and tracking system using motion-based object detection (MogS) and enhanced Kalman filtering (EKF) according to the principles of present invention.

The present invention relates to a system for object tracking and, more particularly, to a system for object tracking using motion-based object detection and an enhanced Kalman-type filtering. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first an introduction provides the reader with a general understanding of the present invention. Next, a description of various principal aspects of the present invention is provided. Finally, specific details of the present invention are provided to give an understanding of the specific aspects.

(1) Principal Aspects

The present invention has three "principal" aspects. The first is a system for object tracking. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object tracking. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Introduction

Object detection and tracking have wide applications in intelligence, surveillance, and reconnaissance (ISR). Many modern technologies require hand-crafted object tracking models. These models are often very complex and require high computation, making them less attractive for resource-limited platforms. Motion-based object detection technology, or MogS, as described in the '269 application and the '742 application, is computationally efficient and requires low memory. It has demonstrated good moving target detection performance in several projects.

Nevertheless, MogS itself is only an object detection technology, which does not rely on any tracking mechanism. In practice, it was determined that MogS may miss detection in some frames. This is understandable because MogS is primarily a frame-by-frame detection approach. In addition, it was observed that MogS detection could drift away due to distraction, appearance change, or occlusion, for instance. These drawbacks called for additional processes to enhance and improve MogS object detection performance.

The Kalman filter is a widely used simple and efficient tracking technique. A conventional Kalman filter can be added into any object detection algorithm to form a simple object tracking system. Using the target location detected by MogS, one could apply Kalman filtering to predict and track the object's moving trajectory. This can potentially track the object's location even when MogS sporadically fails to detect the object. However, the conventional Kalman filter is too simple to deal with the loss of tracking issue for MogS detection. To address this issue, the Kalman filter was enhanced by adding additional modules to control the Kalman updating process based on a spatial distance constraint and an appearance-based matching score. These added modules automatically detect the loss of detection (e.g., drifting away) and modify Kalman updating under certain conditions. In experimental studies, it was found that the enhanced Kalman filter (EKF) described herein significantly reduced the missed detections and sometimes even re-tracked the target after loss of tracking, as will be described in detail below.

(3) Specific Details (3.1) System Overview

According to the principles of the present invention and as shown in FIG. 1, the object tracking system comprises two components: a motion-based object detection component, such as a MogS component 100, and an enhanced Kalman filter (EKF) component 102. FIG. 1 illustrates the components and major processes in the object tracking system of the present invention. The MogS component 100 performs frame-by-frame moving object detection in an input video 104. In a first step 106, the MogS component 100 maintains and online updates a background model that consists of static pixels belonging to the background. During a second step 108, in each new frame the moving pixel can be detected by subtracting the current frame from the background model. In a third step 110 of the process, detected moving pixels are further processed to reduce noise, and blobs of foreground pixels are detected through morphological operation and blob detection.

The MogS component's 100 frame-by-frame detection serves as the evidence of moving objects' locations in the EKF component 102. A Kalman filter prediction module 112 of the EKF component 102 performs prediction of the object's location for the next frame, and a Kalman filter updating module 114 refines the predicted object location using the new evidence for the next frame. Since new evidence is not always available from the MogS component 100 and sometimes the new evidence is not desired, a controller 116 is used to monitor the tracked moving object path and determine when and how to control the Kalman filter updating module 114. In addition, the parameters of the Kalman filter are online updated in a Kalman filter parameters updating module 118 so as to adapt to the dynamics of the moving object. The final output of the system is a set of detected moving object's locations 120 in different frames. Each of these processes/modules is described in further detail below.

(3.2) Motion-Based Object Detection (MogS)

The MogS process was previously described in the '269 application and the '742 application. It is designed to detect moving objects in videos captured by static cameras. MogS maintains and updates a background model for each and every pixel in the image dimension. For each pixel, it builds a codebook that models different modes of pixel color that ever appeared at that pixel location, which is described in detail by Kyungnam Kim et al. in "Real-time foreground-background segmentation using codebook model," in Real-Time Imaging, Volume 11, Issue 3, June 2005 (hereby incorporated by reference as though fully set forth herein). To better deal with color change and illumination changes due to light, view angle, and other factors, MogS disseminates RGB (red, green, blue) color to "color" and "brightness" components. A codeword is the center of a cluster of pixel values restricted by the cylinder feature space illustrated in the aforementioned reference. It corresponds to one mode of the pixel's values. Multiple codewords compose the codebook that models the pixel's values at one image location. All codebooks at different locations together form the background model, which is updated as new pixels' values become available. The update of the background model is important, because natural background often undergoes slow changes.

With the background model, foreground pixels can be easily detected by comparing the new frame with the background model. More specifically, for each pixel, its value is compared to the codewords based on the nearest-neighbor criterion. If no codeword is found close enough to the pixel's value, the pixel most likely has not appeared at this location before and is likely to be in the foreground. Each pixel can be processed in parallel by comparing its value to its codebook. Individually detected foreground pixels will be further processed for reducing noise and be formed into groups using morphological operation. Blob detection detects groups of connected pixels via connected component analysis. The bounding boxes (i.e., detection boxes) of these detected blobs are the output of the MogS component (FIG. 1, element 100), and they indicate the objects detected by the MogS component (FIG. 1, element 100). The bounding boxes are used in the following EKF component (FIG. 1, element 102) for object tracking purposes.

(3.3) Enhanced Kalman-Type Filtering (EKF)

The conventional Kalman filter is a relatively simple and robust process for estimating a linear dynamic system based on noisy observations (i.e., evidence). It has wide applications in control, navigation, computer vision, signal processing, and econometrics. The Kalman filter primarily consists of two stages: prediction and updating. In the prediction stage, the Kalman filter predicts the new states of the dynamic system based on the past learned model. When new evidence is available, the Kalman filter updates the prediction to yield better estimation in the updating stage.

When applied for object tracking, the conventional Kalman filter can interpolate missed object detection thanks to the predication stage. In other words, even without new evidence, the Kalman filter will still generate an estimate of the moving object's new state. This property is valuable for frame-by-frame based object detection approaches including the MogS approach. It can solve the missed detection problem sometimes observed with MogS.

However, the conventional Kalman filter cannot deal with gradual drifting of tracking due to distraction, error propagation, or incorrect observation, for instance. Gradual drifting usually does not violate the smooth dynamics of the object's motion. The Kalman filter will be updated as usual but in the wrong direction due to incorrect observations. To address this issue, a controller (FIG. 1, element 116) was added that monitors the tracking drift and supervises the Kalman filter updating module (FIG. 1, element 114). The controller (FIG. 1, element 116) monitors the similarity between the predicted object and its previous status based on the spatial distance and an appearance-based matching score. If the similarity falls below a predetermined threshold, the prediction is most likely incorrect and the controller (FIG. 1, element 116) will modify the Kalman filter updating module (FIG. 1, element 114) so as to generate a better estimation. The approach is hereinafter referred to as an enhanced Kalman filter (EKF). The working flow of the EKF is illustrated by the flowchart in FIG. 2. Additional details are included in the following sub-sections.

(3.3.1) Modeling the Moving Object's Dynamic System

In one aspect, the moving object's dynamic system was modeled using a linear first-order motion model, as known to those skilled in the art of standard Kalman filter theory. The object's status is characterized by its bounding box (i.e., detection box) defined by its top-left corner $(x_1,y_1)$ and right-bottom corner $(x_2,y_2)$, and a moving speed vector $(dx,dy)$. Let $x=(x_1,x_2,y_1,y_2,dx,dy)$ denote the object's state vector. The object's motion dynamics can be modeled according to the following:

$$x^t = F^t x^{t-1} + w^t,$$

where $F^t$ is the state transition model applied to the object's previous state vector, and $w^t$ is a process noise that is assumed to follow a zero mean multivariate Gaussian distribution N with covariance $Q^t$ according to the following:

$$w^t \sim N(0, Q^t).$$

The observation of the object's state can be modeled with a linear transformation with another zero mean multivariate Gaussian distribution with covariance $R^t$ according to the following:

$$z^t = H^t x^t + v^t, v^t \sim N(0, R^t),$$

where $H^t$ is the matrix that transforms the object's state into its observation and $v^t$ is the additive observation noise.

(3.3.2) Kalman Filter Prediction and Updating

Given the defined dynamic system and appropriate initialization, the Kalman filter iteratively runs prediction and updating to generate the refined estimation of the moving object's state. In the prediction stage, the Kalman filter generates the prediction of the object's new state based on its updated dynamic model so far. Assuming there is no additional force to control the object's motion, the new state can be simply predicted according to the following:

$$\hat{x}^t = F^t x^{t-1}.$$

The estimate covariance matrix $P^t$ that measures the accuracy of the state estimation is also predicted using the following equation:

$$\hat{P}^t = F^t P^{t-1} (F^t)^T + Q^t,$$

where T denotes matrix transpose.

In the updating stage, the Kalman filter uses the object's location detected by the independent MogS approach as the observation $z_t$ of the object's state and refines the Kalman filter prediction to generate smooth tracking results. Standard Kalman filter updating consists of several processes. First, the measurement residual is calculated according to the following:

$$y^t = z^t - H^t \hat{x}^t.$$

Next, the residual covariance matrix $S^t$ is calculated according to the following:

$$S^t = H^t \hat{P}^t (H^t)^T + R^t.$$

Then the optimal Kalman gain is calculated according to the following:

$$K^t = \hat{P}^t (H^t)^T (S^t)^{-1}.$$

Finally, the object's state is updated according to the following:

$$x^t = \hat{x}^t + K^t y^t,$$

and the posteriori estimate covariance is updated according to the following:

$$P^t = (1 - K^t H^t) \hat{P}^t,$$

where I is the identity matrix.

To start the Kalman filtering according to the principles of the present invention, the filter is initialized. Described below are the matrices used as initialization for experimental studies of the present invention. However, as can be appreciated by one skilled in the art, the non-limiting example presented below should not be considered as a fixed initialization process for different tasks. The conventional Kalman filter also needs some initialization. How to initialize the Kalman filter depends on the design and implementation for a specific task.

Appropriate initialization is important and often requires cross validation or empirical adjustment according to the task. In one aspect of the present invention, manual detection is used for the first frame to initialize the object state vector $x^0$. Nevertheless, other form-based object detection methods, such as those that use saliency for object detection, can replace the manual detection process to initialize the object state. Saliency for object detection is described by Liu et al. in "Learning to Detect a Salient Object" In Proceedings of the IEEE Conference on Computer Vision and Pattern Recognition (CVPR), Minneapolis, Minn., 2007, which is hereby incorporated by reference as though fully set forth herein. The matrices used in Kalman filtering for the present invention were empirically initialized according to the following:

$$F^0 = \begin{bmatrix} 1 & 0 & 0 & 0 & 1 & 0 \\ 0 & 1 & 0 & 0 & 0 & 1 \\ 0 & 0 & 1 & 0 & 1 & 0 \\ 0 & 0 & 0 & 1 & 0 & 1 \\ 0 & 0 & 0 & 0 & 1 & 0 \\ 0 & 0 & 0 & 0 & 0 & 1 \end{bmatrix}, Q^0 = \begin{bmatrix} \frac{1}{4} & 0 & 0 & 0 & \frac{1}{2} & 0 \\ 0 & \frac{1}{4} & 0 & 0 & 0 & \frac{1}{2} \\ 0 & 0 & \frac{1}{4} & 0 & \frac{1}{2} & 0 \\ 0 & 0 & 0 & \frac{1}{4} & 0 & \frac{1}{2} \\ \frac{1}{2} & 0 & \frac{1}{2} & 0 & 1 & 0 \\ 0 & \frac{1}{2} & 0 & \frac{1}{2} & 0 & 1 \end{bmatrix} \times 10^{-2}$$

$$H^0 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \end{bmatrix}, P^0 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \times 10^4$$

After initialization, for each new incoming frame, the Kalman filter sequentially does prediction and updating using the above equations and generates the object's tracking results based on MogS frame-by-frame detection.

(3.3.3) Kalman Filter Controller

The Kalman filter works well when the object undergoes linear smooth motion and the observation is not significantly corrupted due to noise or other reasons. It can interpolate the object's moving location to generate a smooth trace of motion. Even when MogS misses detecting the object sporadically, the Kalman filter can often estimate the object's location along its moving trajectory.

Nevertheless, the conventional Kalman filter may also fail when the MogS detection is too noisy and incorrect. As a non-limiting example, the conventional Kalman filter may fail when there is distraction due to flying dust or other objects nearby, since MogS can detect them as moving objects. Such MogS detection gives incorrect information for the Kalman filter to update its dynamic model and its estimation of the object's true state. If MogS gives such incorrect detections continuously, the Kalman filter estimation will gradually drift away from the object's actual moving path, which leads to failed tracking. Therefore, according to the principles of the present invention, the conventional Kalman filter was enhanced by adding a controller to ameliorate this issue.

Figure 2:
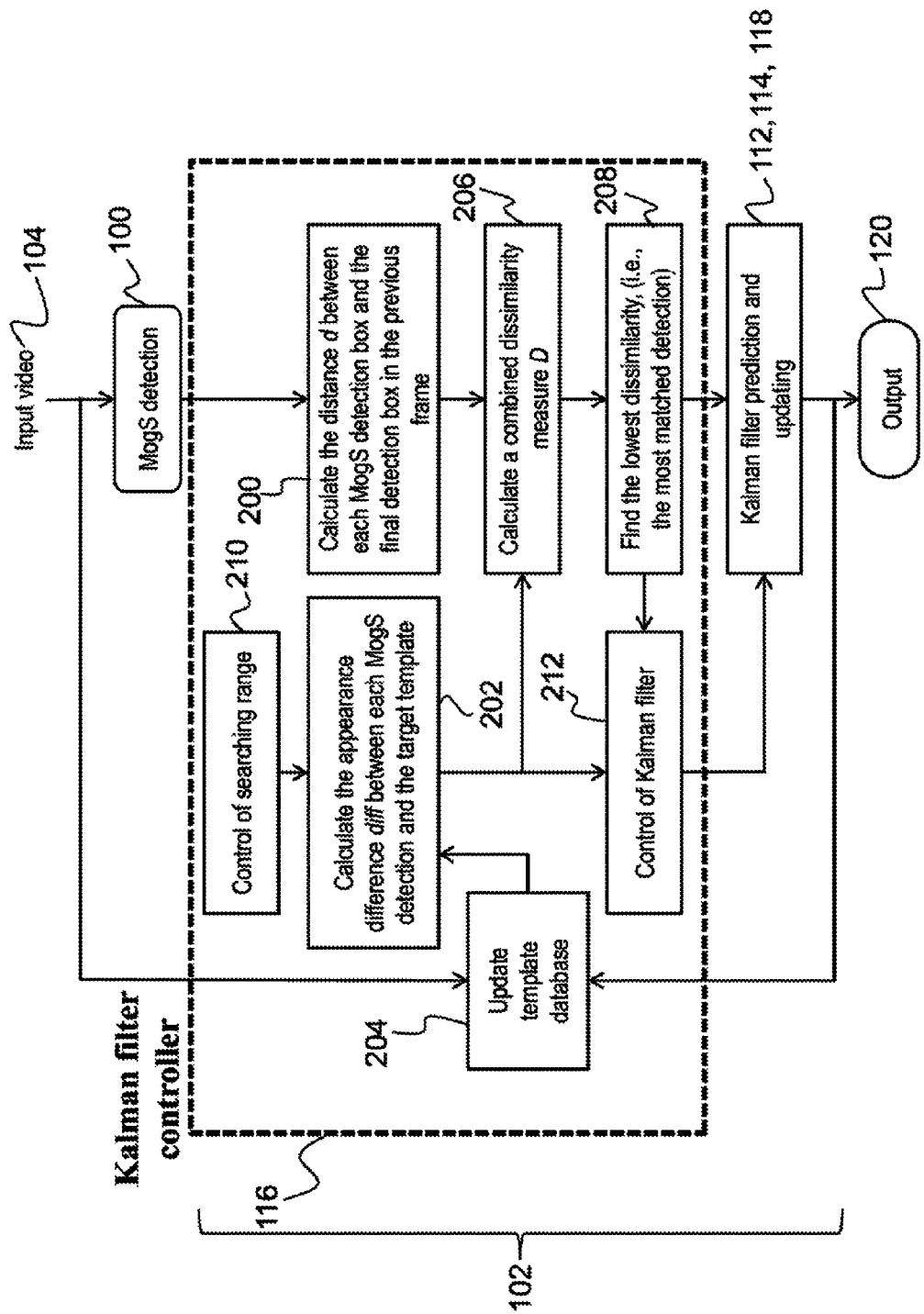
FIG. 2 illustrates a Kalman filter controller working with MogS detection according to the principles of the present invention.

As illustrated in FIG. 2, the controller 116 is primarily responsible for monitoring the tracking quality and controlling the updating stage of the Kalman filter. The MogS component 100 processes the input video 104 as described above. To address the above issues due to incorrect observations, in a first step 200, the controller 116 first calculates the spatial distance d between each bounding box detected by the MogS component 100 and the final tracked object's bounding box in the previous frame, where d≥0.

In a second step 202, the controller 116 calculates a dissimilarity metric diff between the predicted object (i.e., the image enclosed by the bounding box detected by the MogS component 100) and its historical template(s) stored in a template database 204. The historical template is the object's image inside its bounding box that was tracked previously. Multiple template images can possibly be used in the template database 204 as well. The dissimilarity metric diff is calculated based on the appearance difference of the image patch of each MogS detection centered at the predicted location and the target image template in the template database 204.

In a third step 206, the dissimilarity metric diff from the second step 202 and the spatial distance d from the first step 200 are used to calculate a combined dissimilarity measure D. Since the MogS component 100 can possibly generate multiple detections for the new frame, in a fourth step 208, the system finds the one with the lowest combined dissimilarity measure D calculated by the third step 206. The fourth step 208 only searches the detections within a searching range not far away from the tracked target's location in the previous frame. The searching range is controlled by a predefined distance threshold (i.e., control of searching range 210). The fourth step 208 is used to find the one detection with the lowest combined dissimilarity measure D that corresponds to the most likely tracked target in the current new frame, which acts to control the Kalman filter 212. Specifically, based on its dissimilarity metric diff (i.e., appearance difference from the second step 202) and its spatial distance d from the tracked target's location in the previous frame (i.e., from the first step 200), the controller 116 adjusts the Kalman filtering process (i.e., Kalman filter prediction and updating, elements 112, 114, and 116) and generates the tracked object's location in output 120.

Different metrics can be used to calculate the dissimilarity metric diff (FIG. 2, element 202). Two approaches were tested in experimental studies. First, an intensity histogram vector was generated for the image patch and the template image. For this approach, let $f_1$ and $f_2$ denote the histogram vector for the image patch and the template image, respectively. In one aspect, the dissimilarity metric diff can be calculated as the geometric difference between two vectors according to the following:

$$\mathit{diff} = \frac{1}{M}\sqrt{\sum_i (f_1^i - f_2^i)^2},$$

where $f_j^i$ denotes the ith bin of the histogram $f_j$ and M is the number of bins.

Second, the average intensity difference between the image patch and the template image can be used to calculate the dissimilarity metric diff according to the following:

$$\mathit{diff} = \frac{1}{N}\left(\sum_{x,y} |I_1^{(x,y)} - I_2^{(x,y)}|\right),$$

where N is the total number of pixels in the image patch $I_1$ and the template image $I_2$. Besides these methods to calculate the dissimilarity metric diff, other approaches are within the scope of the principles of the present invention.

Once the spatial distance d (FIG. 2, element 200) and the dissimilarity metric diff (FIG. 2, element 202) are calculated, the two measurements are merged by a linear combination to generate a new combined dissimilarity measure D (FIG. 2, element 206) that quantifies the dissimilarity between the object's predicted state and its previous tracked location and its historical template image(s) according to the following:

$$D = \alpha * \frac{1 - e^{-\beta * d}}{1 + e^{-\beta * d}} + (1 - \alpha) * \mathit{diff}.$$

where $\alpha \in (0,1)$ is a constant scalar, $d \geq 0$, and $\beta > 0$ is a constant scalar. Given a fixed $\beta$, the first part of equation for D, $$\left(\text{i.e.,}\ \frac{1-e^{-\beta *d}}{1+e^{-\beta *d}}\right)$$

is a function of the spatial distance d. If one plots this function versus different values of d, a curve is obtained. When $\beta$ is changed to a different value, the steepness of the curve changes. Thus, $\beta > 0$ is a constant scalar to control the steepness of the curve.

The combined dissimilarity measure D (FIG. 2, element 206) takes into account both the spatial distance d (FIG. 2, element 200) and the dissimilarity metric diff (FIG. 2, element 202). It is within the principles of the present invention to combine the two measures other than that described herein. Additionally, it is within the principles of the present invention to use the measures, but not combine them. If the predicted location is too far from the previous tracked location, the combined dissimilarity measure D increases. If the appearance in the predicted location is very different from the images in the template database 204, the combined dissimilarity measure D also increases. Therefore, this combined dissimilarity measure D makes a compromise of two factors in estimating the prediction quality. Thus, the goal is to find the lowest combined dissimilarity measure D (i.e., the most matched detection) in the fourth step 208 to be used for Kalman filter prediction and updating (elements 112, 114, and 118).

One can use the combined dissimilarity measure D as a metric to monitor the quality of Kalman filter prediction using the controller 116. If the combined dissimilarity measure D is below a predetermined threshold, the controller 116 will adjust the Kalman filter updating process (FIG. 1, element 114) accordingly so as to improve tracking. More specifically, if the spatial distance d between the predicted location and the object's previous tracked location is above the predetermined threshold (e.g., too far), the new MogS observation will be ignored and the previous MogS detection will be used instead. Thus, the Kalman updating will be temporarily prevented for this frame. If the combined dissimilarity measure D is above the predetermined threshold, the appearance of the predicted object is too different from the template image or the predicted location is too far from the previous tracking; in such cases, the Kalman filter is reinitialized to re-learn the object's motion dynamics. With these careful controls, the enhanced Kalman filter can ameliorate the problem due to drifting, and recover object tracking even when MogS detection is continuously incorrect for a short period.

Figure 3A:
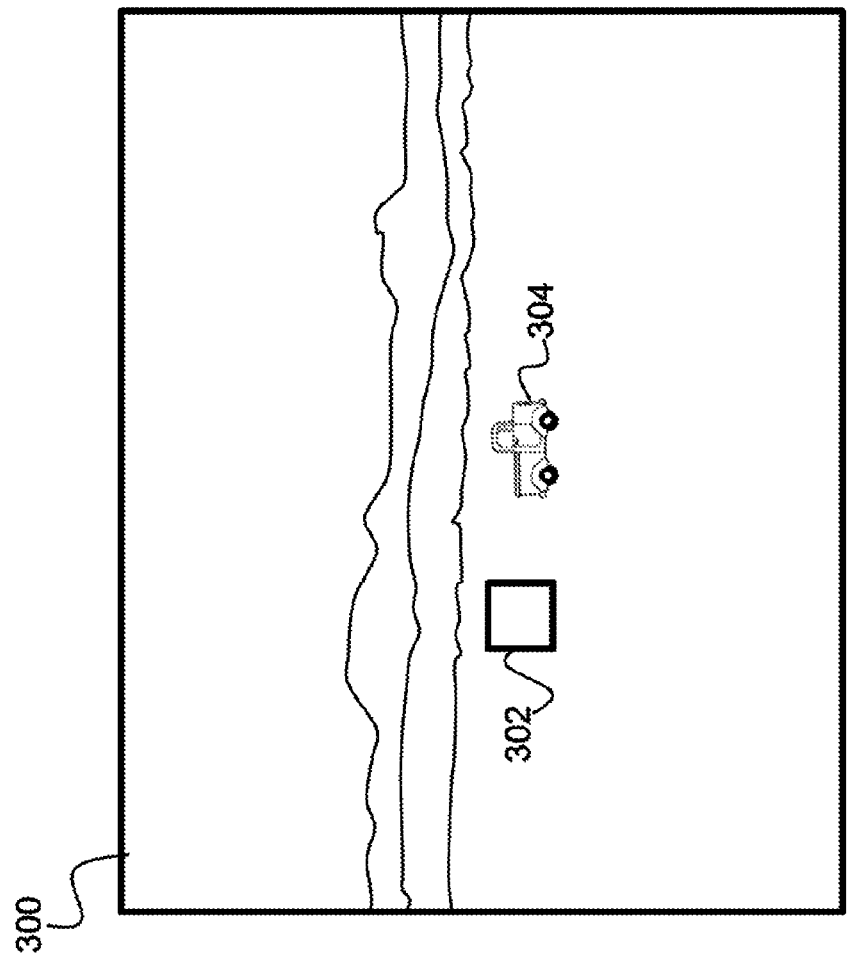
FIG. 3A illustrates a scene showing MogS object detection without EKF according to the principles of the present invention.
Figure 3B:
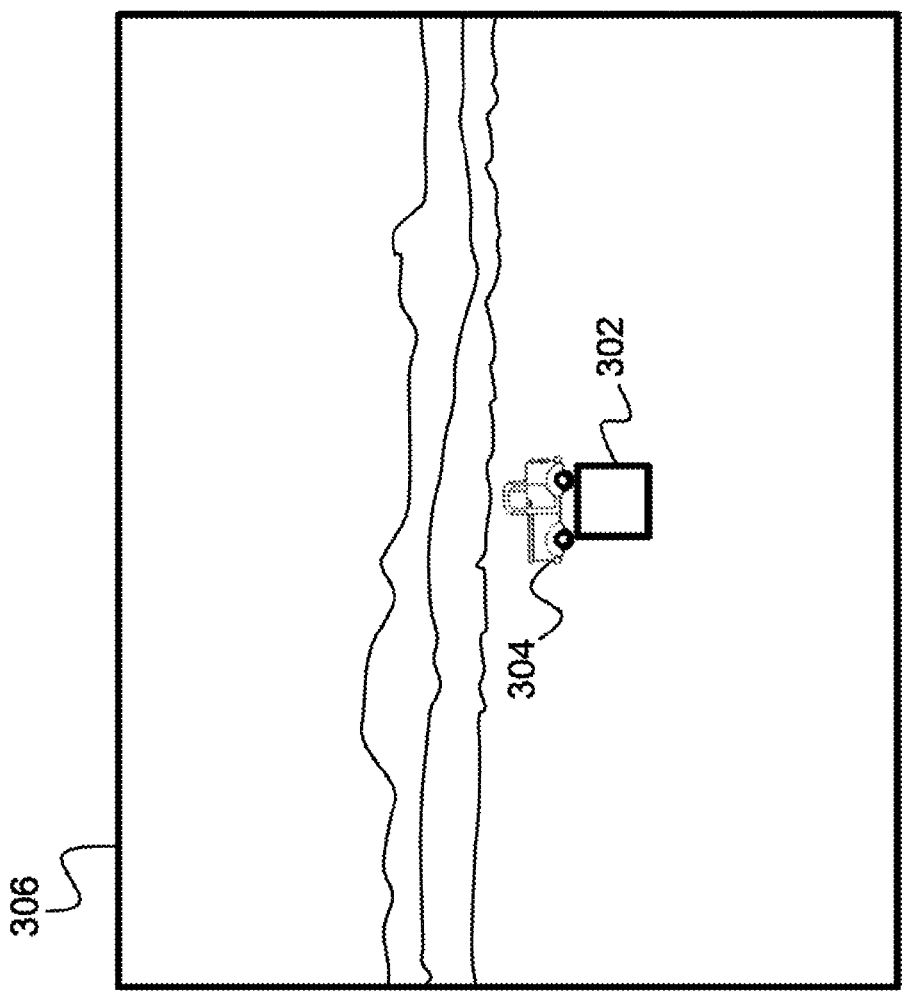
FIG. 3B illustrates a scene showing MogS object detection with EKF according to the principles of the present invention.

FIGS. 3A and 3B illustrate non-limiting examples of such situations. As shown in FIG. 3A, without the aid of EKF in processing a scene 300, MogS detection (represented by a detection box 302) drifts far away from a moving object's (e.g., vehicle 304) location. FIG. 3B depicts another scene 306 which was processed by both MogS and EKF. As shown in FIG. 3B, the combination of MogS and EKF can still reasonably estimate the moving vehicle's 304 location, which is not too far from its actual location, as indicated by the detection box 302 being closer to the moving vehicle 304 than in FIG. 3A. However, it is impractical to fully eliminate the impact of the drifting to completely resolve this notorious tracking challenge.

Finally, for long-period tracking, the object may undergo appearance changes due to turning or environment changes, for example. Referring back to FIG. 2, in such cases, it is necessary to build a historical template database 204 that stores multiple significantly different modes of the object's appearance. A clustering based approach is used, such as the hierarchical clustering method described in detail by Deng Cai et al. in "Hierarchical clustering of WWW image search results using visual, textual and link information," in the proceedings of the 12th annual ACM international conference on multimedia, pages 952-959, 2004, which is hereby incorporated by reference as though fully set forth herein. A clustering based approach can be used to detect if there is already a template that is close enough to the current object's appearance (i.e., a target template). When tracking goes along, the historical template database 204 may be updated so as to take into account the appearance change of the object. When there are multiple templates, the dissimilarity metric diff (element 202) should be calculated as the minimum appearance-based dissimilarity of the current object prediction with respect to multiple image templates in the template database 204.

(3.4) Experimental Studies

The object tracking system according to the principles of the present invention was tested on six video sequences. Among the six video sequences, three videos were captured from electro-optical (EO) cameras at different ranges, and three videos were captured from infrared (IR) cameras. Each video had about 1800 frames and contained one moving target in some frames. The resolution of the EO videos was 640×480 pixels, while the resolution of the IR videos was 640×512 pixels. MogS detection and EKF were run for object tracking on the aforementioned videos. The tracking results were compared with the ground-truth frame-by-frame to generate receiver operating characteristic (ROC) curves. ROC curves were also generated for MogS detection results (without EKF tracking) for comparison. Therefore, referring to FIGS. 1 and 2, object tracking results using only the MogS component 100 were compared to object tracking results using the MogS component 100 with the EKF component 102.

Figure 4A:
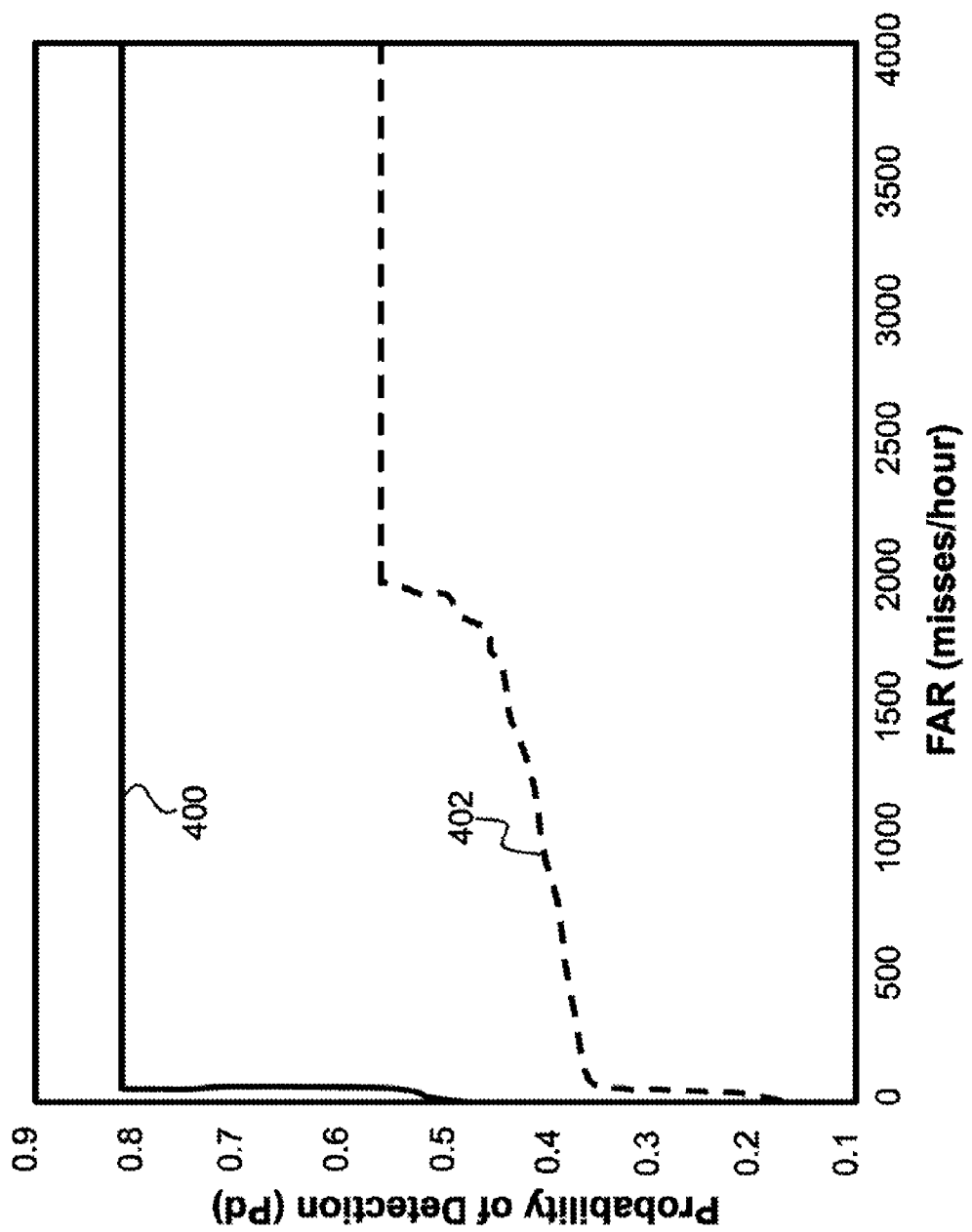
FIG. 4A illustrates receiver operating characteristic (ROC) curves for an electro-optical (EO) video comparing MogS detection results with MogS and EKF detection results according to the principles of the present invention.
Figure 4B:
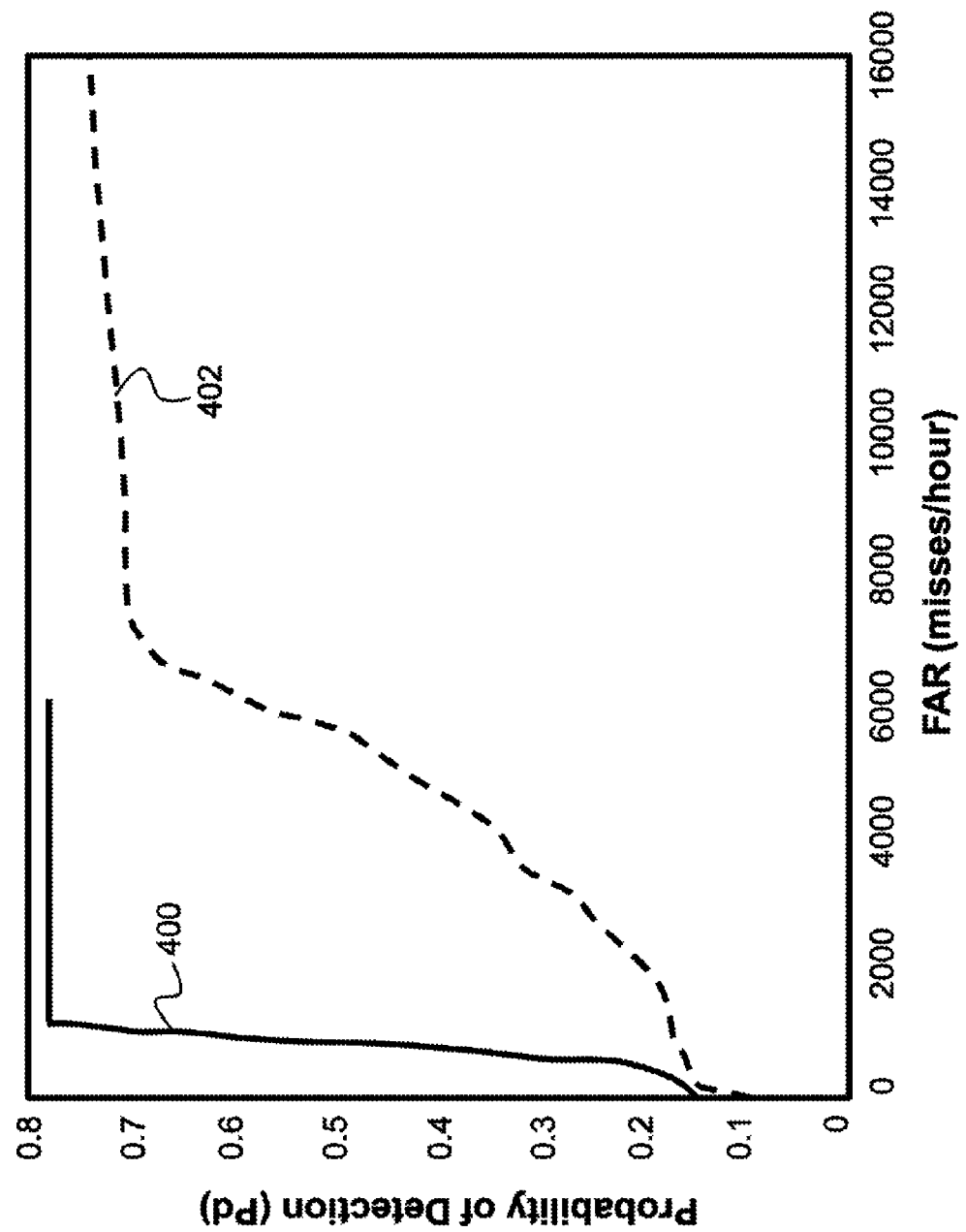
FIG. 4B illustrates receiver operating characteristic (ROC) curves for an infrared (IR) video comparing MogS detection results with MogS and EKF detection results according to the principles of the present invention.
Figure 4C:
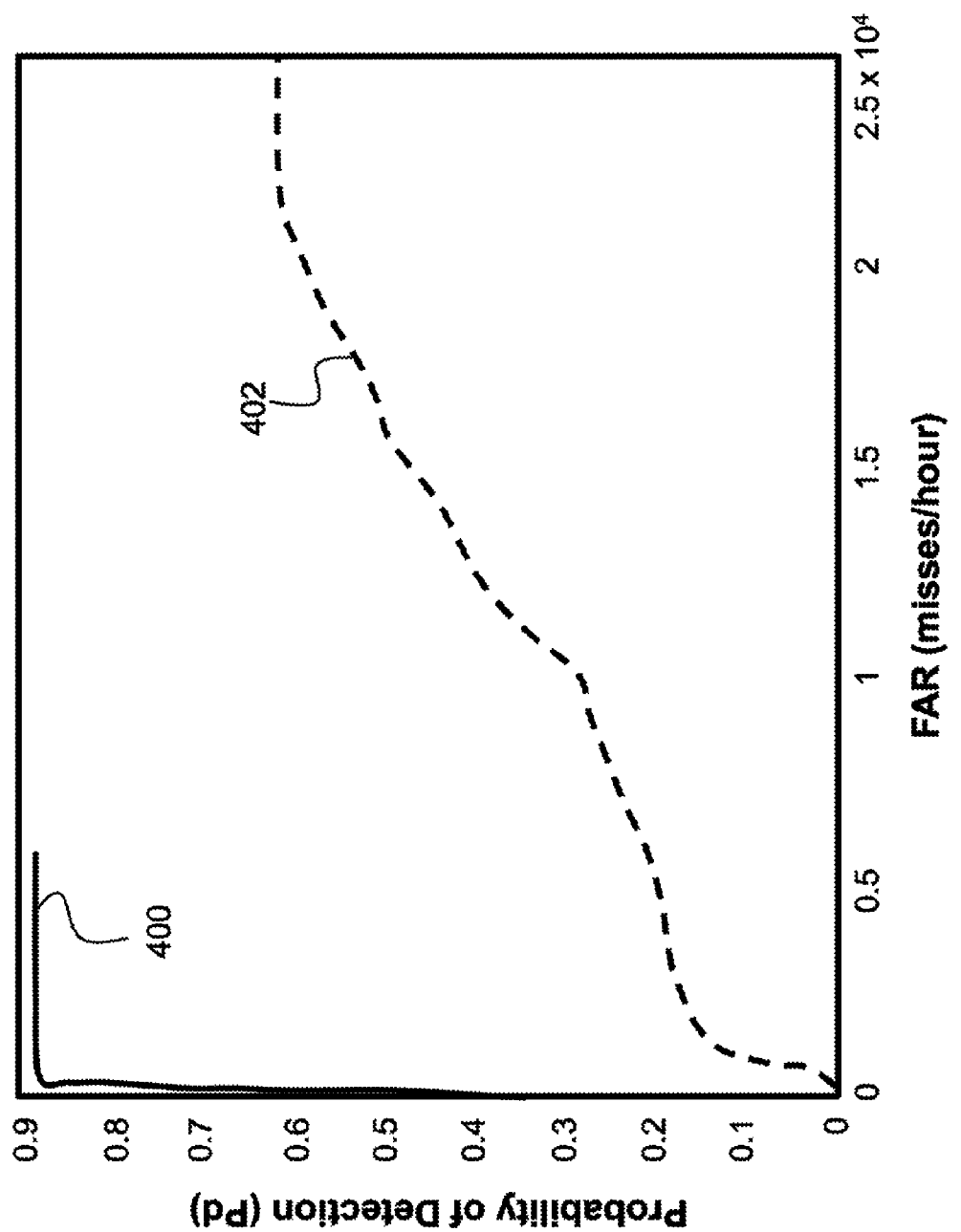
FIG. 4C illustrates receiver operating characteristic (ROC) curves for an EO video comparing MogS detection results with MogS and EKF detection results according to the principles of the present invention.
Figure 4D:
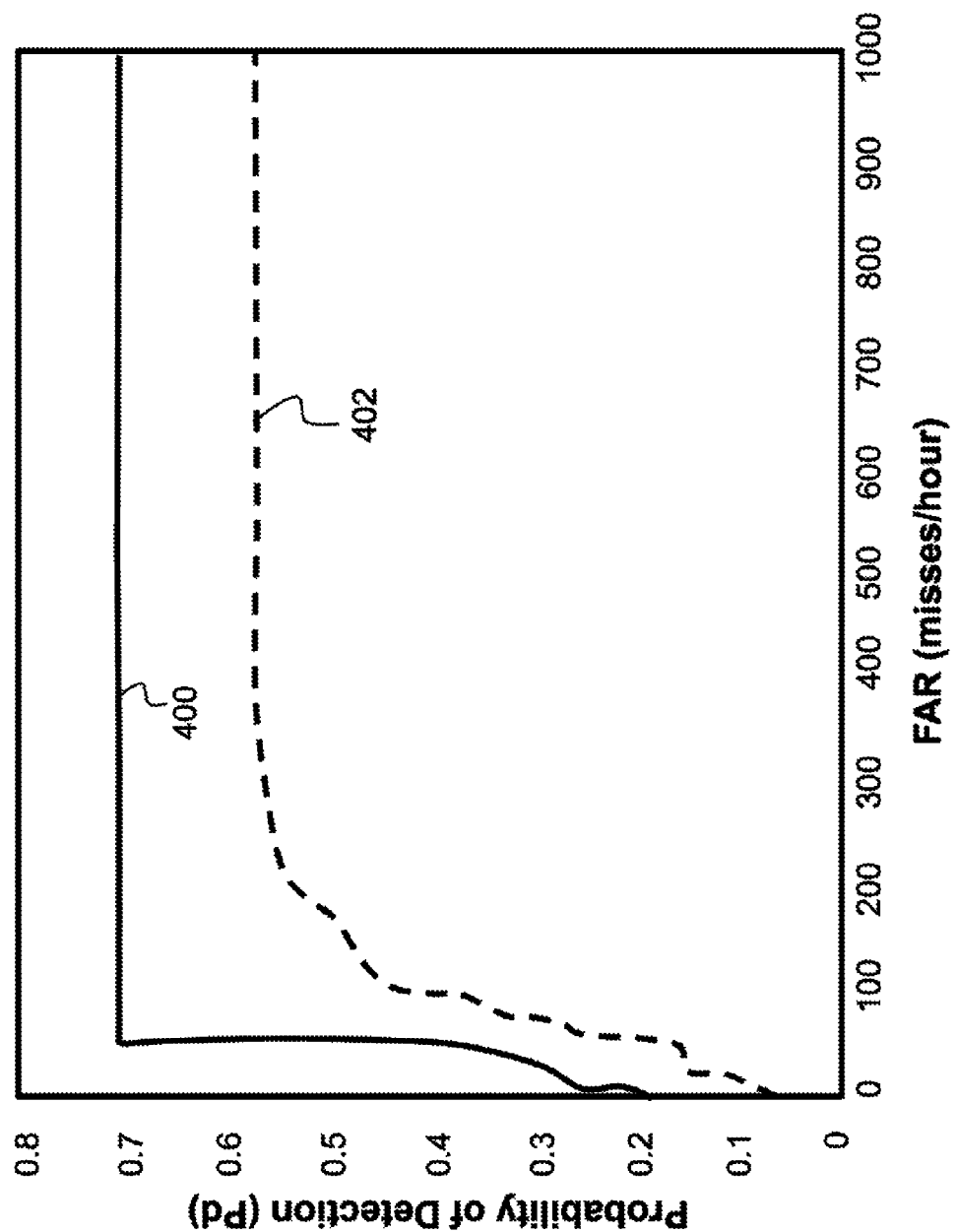
FIG. 4D illustrates receiver operating characteristic (ROC) curves for an IR video comparing MogS detection results with MogS and EKF detection results according to the principles of the present invention.
Figure 4E:
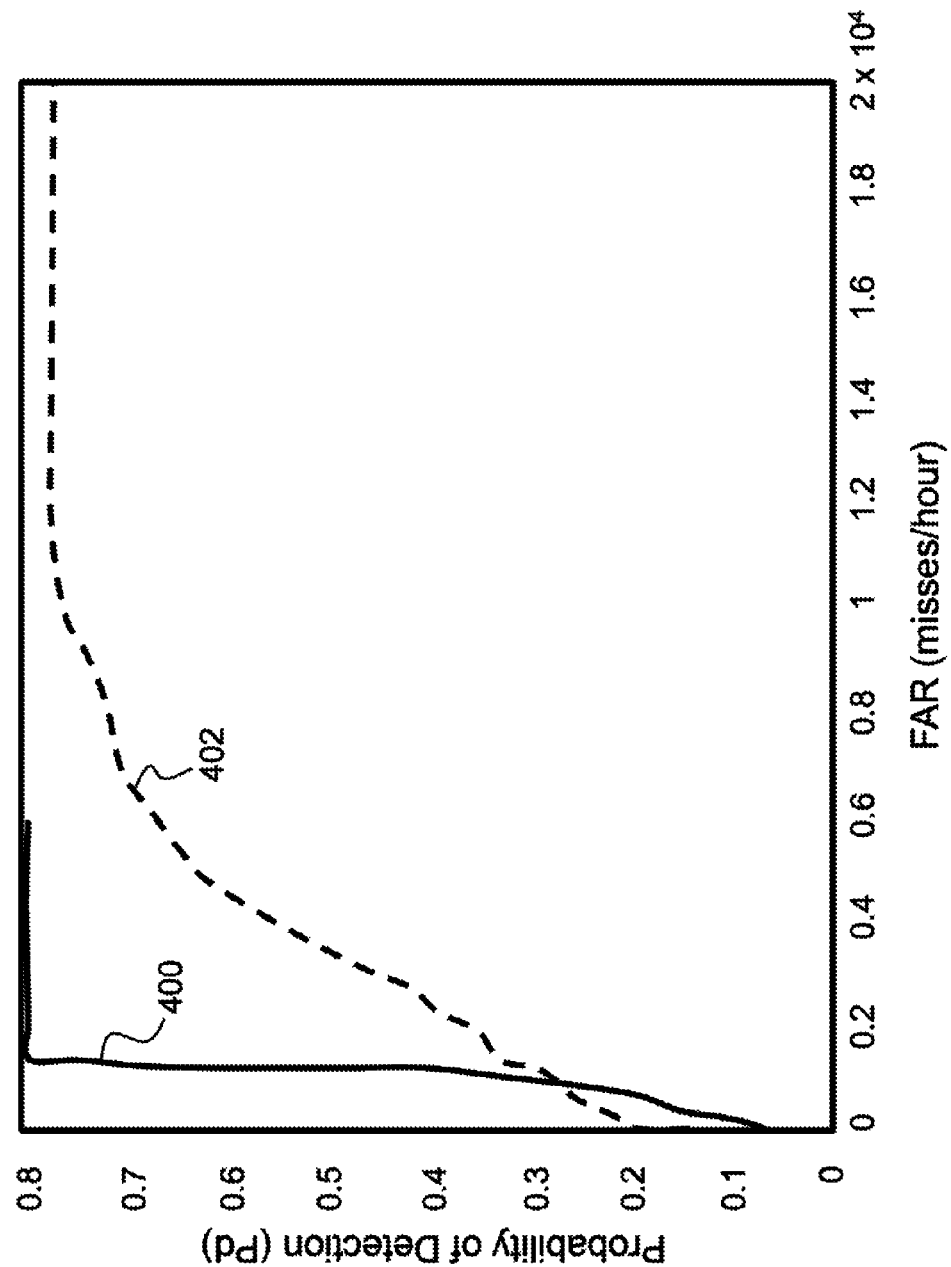
FIG. 4E illustrates receiver operating characteristic (ROC) curves for an EO video comparing MogS detection results with MogS and EKF detection results according to the principles of the present invention.
Figure 4F:
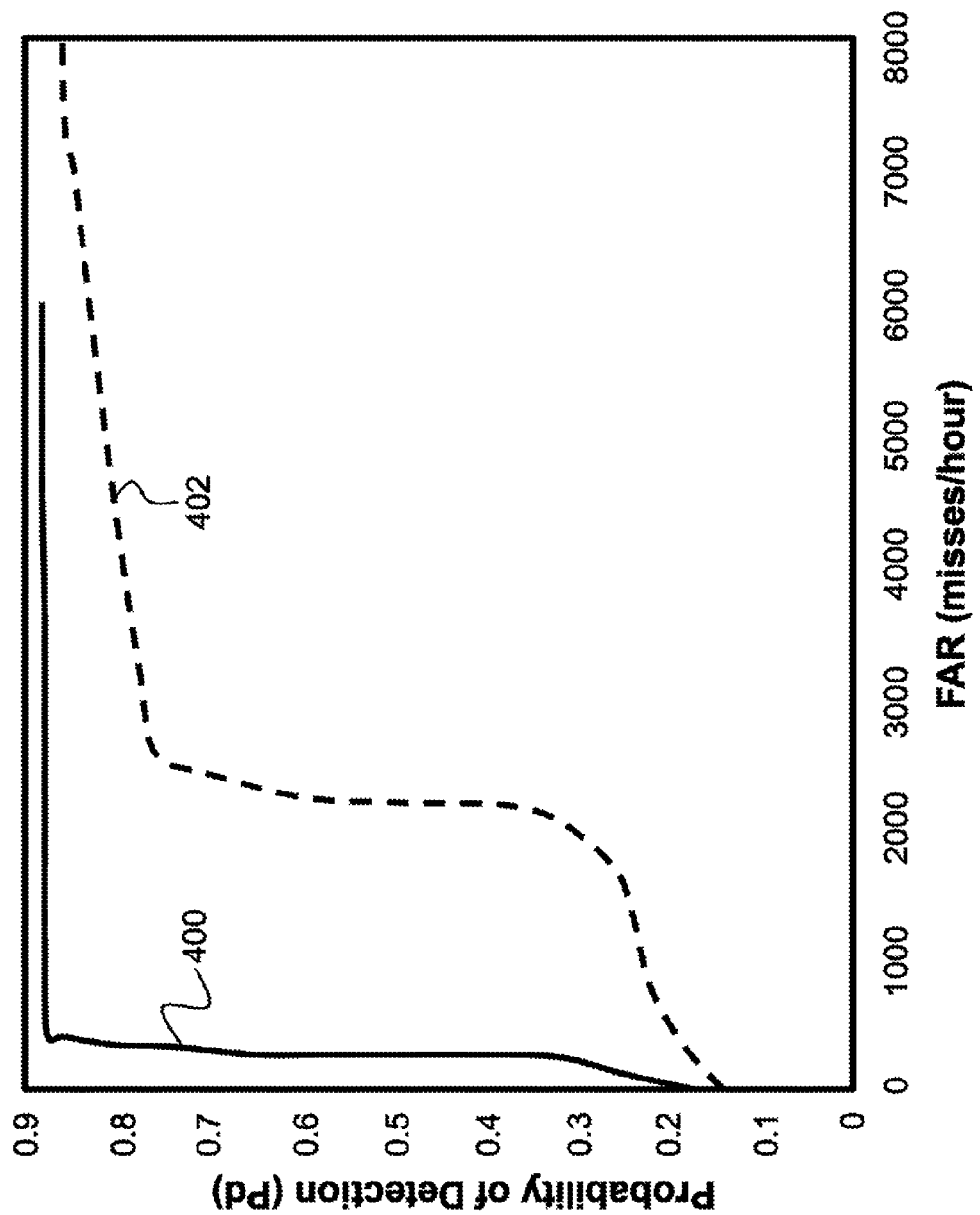
FIG. 4F illustrates receiver operating characteristic (ROC) curves for an IR video comparing MogS detection results with MogS and EKF detection results according to the principles of the present invention.

FIGS. 4A-4E show the ROC curves for each testing video, with each solid curve 400 representing the combination of the MogS component with the EKF component, and each dashed curve 402 representing the MogS component alone. FIGS. 4A, 4C, and 4E are ROC curves for the three EO videos, while FIGS. 4B, 4D, and 4F are ROC curves for the three IR videos. It was observed that when using the EKF component with the MogS component, the moving object detection accuracy was generally improved. Additionally, the false positive per frame was reduced. The ROC curves for the MogS component with the EKF component (solid curves 400) usually shifted to the top left and had a higher area under curve (AUC) than the ROC curves for the MogS component alone (dashed curves 402). These results demonstrated that the EKF technique could generally boost the moving object detection performance on top of the MogS detection. When MogS is integrated with EKF, they form a complete object tracking system that is simple, easy-to-implement, computationally efficient, and appropriate for deployment in resource-limited platforms.

Finally, the EKF technique is very general and can be used with other frame-based object detection systems as well. One can use the detection generated by other approaches as the evidence used in EKF. Then, EKF will take care of predicting and adjusting the updating of the prediction so as to achieve improved object detection/tracking results.

Figure 5:
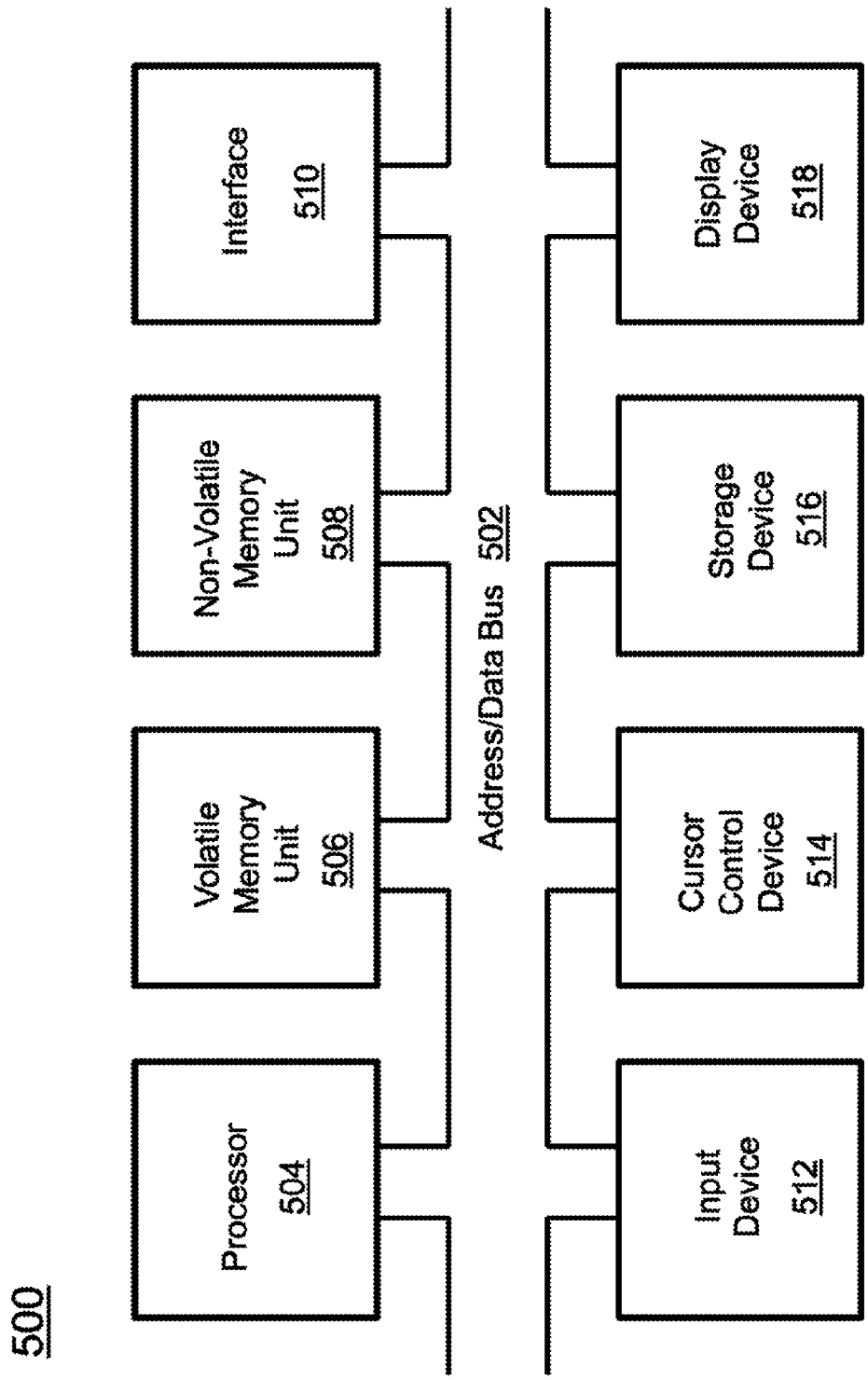
FIG. 5 is an illustration of a data processing system according to the principles of the present invention.

An example of a computer system 500 in accordance with one aspect is shown in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504, are coupled with the address/data bus 502. The processor 504 is configured to process information and instructions. In one aspect, the processor 504 is a microprocessor. Alternatively, the processor 504 may be a different type of processor such as a parallel processor, or a field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In an embodiment, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In one aspect, the computer system 500 may include a cursor control device 514 coupled with the address/data bus 502, wherein the cursor control device 514 is configured to communicate user input information and/or command selections to the processor 500. In one aspect, the cursor control device 514 is implemented using a device such as a mouse, a track-ball, a track-pad, an optical tracking device, or a touch screen. The foregoing notwithstanding, in one aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In one aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In one aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with one aspect. However, the non-limiting example of the computer system 500 is not strictly limited to being a computer system. For example, one aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product embodying an aspect of the present invention is depicted in FIG. 6. As a non-limiting example, the computer program product is depicted as either a floppy disk 600 or an optical disk 602. However, as mentioned previously, the computer program product generally represents computer readable code (i.e., instruction means or instructions) stored on any compatible non-transitory computer readable medium.

What is claimed is:

1. A system for object tracking, the system comprising:
   one or more processors and a non-transitory memory having instructions encoded thereon such that when the instructions are executed, the one or more processors perform operations of:
   detecting a location of a moving object in an image frame of a sequence of image frames using a motion-based object detection MogS module, thereby generating an object detection;
   for each image frame in the sequence of image frames, predicting the location of the moving object in the next image frame through object tracking using a Kalman filter prediction module, thereby generating a predicted object location;

monitoring object tracking quality using a controller module;

refining the predicted object location using a Kalman filter updating module;

adjusting, by the controller module, the Kalman filter updating module according to a dissimilarity measure based on a spatial distance constraint and an appearance-based matching score, thereby improving object tracking quality and ameliorating gradual drifting of object tracking; and outputting a set of detected moving object locations in the sequence of image frames.

2. The system as set forth in claim 1, wherein the one or more processors further perform an operation of determining a spatial distance d between each object detection in a current image frame and the object detection in the previous image frame with the controller module.

3. The system as set forth in claim 2, wherein the one or more processors further perform an operation of determining a dissimilarity metric diff based on the appearance difference between a detected image at the predicted object location and a target image template stored in a historical template database.

4. The system as set forth in claim 3, wherein the one or more processors further perform an operation of merging the spatial distance d with the dissimilarity metric diff to generate a combined dissimilarity measure D that quantifies the dissimilarity of the predicted object location with the moving object's location in the previous image frame.

5. The system as set forth in claim 4, wherein the one or more processors further perform an operation of generating the combined dissimilarity measure D according to the following:

$$D = \alpha * \frac{1 - e^{-\beta * d}}{1 + e^{-\beta * d}} + (1 - \alpha) * \text{diff},$$

where $\alpha \in (0,1)$ is a constant scalar, $\beta > 0$ is a constant scalar, * denotes multiplication, $d \geq 0$, and $e^x$ represents an exponential function.

6. The system as set forth in claim 5, wherein the one or more processors further perform operations of:

updating a background model comprising a plurality of pixels belonging to a background of an image frame;

in each image frame, detecting at least one moving pixel by subtracting the current image frame from the background model, generating detected moving pixels;

processing the detected moving pixels to reduce noise; and detecting blobs of foreground pixels through morphological operations and blob detection, resulting in an object detection.

7. The system as set forth in claim 1, wherein the one or more processors further perform operations of:

updating a background model comprising a plurality of pixels belonging to a background of an image frame;

in each image frame, detecting at least one moving pixel by subtracting the current image frame from the background model, generating detected moving pixels;

processing the detected moving pixels to reduce noise; and detecting blobs of foreground pixels through morphological operations and blob detection, resulting in an object detection.

8. A computer-implemented method for object tracking, comprising:

an act of causing a data processor to execute instructions stored on a non-transitory memory such that upon execution, the data processor performs operations of:

detecting a location of a moving object in an image frame of a sequence of image detecting a location of a moving object in an image frame of a sequence of image frames using a motion-based object detection MogS module, thereby generating an object detection;

for each image frame in the sequence of image frames, predicting the location of the moving object in the next image frame through object tracking using a Kalman filter prediction module, thereby generating a predicted object location;

monitoring object tracking quality using a controller module;

refining the predicted object location using a Kalman filter updating module;

adjusting, by the controller module, the Kalman filter updating module according to a dissimilarity measure based on a spatial distance constraint and an appearance-based matching score, thereby improving object tracking quality and ameliorating gradual drifting of object tracking; and outputting a set of detected moving object locations in the sequence of image frames.

9. The method as set forth in claim 8, wherein the data processor further performs an operation of determining a spatial distance d between each object detection in a current image frame and the object detection in the previous image frame with the controller module.

10. The method as set forth in claim 9, wherein the data processor further perform an operation of determining a dissimilarity metric diff based on the appearance difference between a detected image at the predicted object location and a target image template stored in a historical template database.

11. The method as set forth in claim 10, wherein the data processor further performs an operation of merging the spatial distance d with the dissimilarity metric diff to generate a combined dissimilarity measure D that quantifies the dissimilarity of the predicted object location with the moving object's location in the previous image frame.

12. The method as set forth in claim 11, wherein the data processor further performs an operation of generating the combined dissimilarity measure D according to the following:

$$D = \alpha * \frac{1 - e^{-\beta * d}}{1 + e^{-\beta * d}} + (1 - \alpha) * \text{diff},$$

where $\alpha \in (0,1)$ is a constant scalar, $\beta > 0$ is a constant scalar, * denotes multiplication, $d \geq 0$, and $e^x$ represents an exponential function.

13. The method as set forth in claim 12, wherein the data processor further performs operations of:

updating a background model comprising a plurality of pixels belonging to a background of an image frame;

in each image frame, detecting at least one moving pixel by subtracting the current image frame from the background model, generating detected moving pixels;

processing the detected moving pixels to reduce noise; and detecting blobs of foreground pixels through morphological operations and blob detection, resulting in an object detection.

14. The method as set forth in claim 8, wherein the data processor further performs operations of:
updating a background model comprising a plurality of pixels belonging to a background of an image frame;
in each image frame, detecting at least one moving pixel by subtracting the current image frame from the background model, generating detected moving pixels;
processing the detected moving pixels to reduce noise; and
detecting blobs of foreground pixels through morphological operations and blob detection, resulting in an object detection.

15. A computer program product for object tracking, the computer program product comprising computer-readable instructions stored on a non-transitory computer-readable medium that are executable by a computer having a processor for causing the processor to perform operations of:
detecting a location of a moving object in an image frame of a sequence of image frames using a motion-based object detection MogS module, thereby generating an object detection;
for each image frame in the sequence of image frames, predicting the location of the moving object in the next image frame through object tracking using a Kalman filter prediction module, thereby generating a predicted object location;
monitoring object tracking quality using a controller module;
refining the predicted object location using a Kalman filter updating module;
adjusting, by the controller module, the Kalman filter updating module according to a dissimilarity measure based on a spatial distance constraint and an appearance-based matching score, thereby improving object tracking quality and ameliorating gradual drifting of object tracking; and
outputting a set of detected moving object locations in the sequence of image frames.

16. The computer program product as set forth in claim 15, further comprising instructions for causing the processor to perform an operation of determining a spatial distance d between each object detection in a current image frame and the object detection in the previous image frame with the controller module.

17. The computer program product as set forth in claim 16, further comprising instructions for causing the processor to perform an operation of determining a dissimilarity metric diff based on the appearance difference between a detected image at the predicted object location and a target image template stored in a historical template database.

18. The computer program product as set forth in claim 17, further comprising instructions for causing the processor to perform an operation of merging the spatial distance d with the dissimilarity metric diff to generate a combined dissimilarity measure D that quantifies the dissimilarity of the predicted object location with the moving object's location in the previous image frame.

19. The computer program product as set forth in claim 18, further comprising instructions for causing the processor to perform an operation of generating the combined dissimilarity measure D according to the following:

$$D = \alpha * \frac{1 - e^{-\beta * d}}{1 + e^{-\beta * d}} + (1 - \alpha) * \textit{diff},$$

where $\alpha \in (0,1)$ is a constant scalar, $\beta > 0$ is a constant scalar, * denotes multiplication, $d \geq 0$, and $e^x$ represents an exponential function.

20. The computer program product as set forth in claim 19, further comprising instructions for causing the processor to perform operations of:
updating a background model comprising a plurality of pixels belonging to a background of an image frame;
in each image frame, detecting at least one moving pixel by subtracting the current image frame from the background model, generating detected moving pixels;
processing the detected moving pixels to reduce noise; and
detecting blobs of foreground pixels through morphological operations and blob detection, resulting in an object detection.

21. The computer program product as set forth in claim 15, further comprising instructions for causing the processor to perform operations of:
updating a background model comprising a plurality of pixels belonging to a background of an image frame;
in each image frame, detecting at least one moving pixel by subtracting the current image frame from the background model, generating detected moving pixels;
processing the detected moving pixels to reduce noise; and
detecting blobs of foreground pixels through morphological operations and blob detection, resulting in an object detection.

* * * * *